United States Patent
Sakai

(10) Patent No.: US 10,908,572 B2
(45) Date of Patent: Feb. 2, 2021

(54) PROGRAMMABLE CONTROLLER AND MACHINE LEARNING DEVICE

(71) Applicant: FANUC Corporation, Yamanashi (JP)

(72) Inventor: Yutaka Sakai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 86 days.

(21) Appl. No.: 16/412,432

(22) Filed: May 15, 2019

(65) Prior Publication Data

US 2019/0361415 A1    Nov. 28, 2019

(30) Foreign Application Priority Data

May 24, 2018 (JP) ................................ 2018-100021

(51) Int. Cl.
  *G05B 19/042*    (2006.01)
  *G05B 13/02*    (2006.01)

(52) U.S. Cl.
  CPC ....... *G05B 19/042* (2013.01); *G05B 13/0265* (2013.01); *G05B 2219/23288* (2013.01); *G05B 2219/25399* (2013.01)

(58) Field of Classification Search
  CPC ............ G05B 19/042; G05B 13/0265; G05B 2219/23288; G05B 2219/25399
  See application file for complete search history.

(56) References Cited

U.S. PATENT DOCUMENTS

| | | | |
|---|---|---|---|
| 2002/0026257 A1* | 2/2002 | Newmark | G05B 19/41805 700/108 |
| 2003/0110006 A1* | 6/2003 | Nakamura | G05B 19/406 702/176 |
| 2005/0055109 A1* | 3/2005 | Nagashima | G05B 19/042 700/23 |
| 2007/0162906 A1* | 7/2007 | Chandhoke | G06F 9/485 718/100 |
| 2011/0208952 A1 | 8/2011 | Kokura et al. | |
| 2015/0112459 A1* | 4/2015 | Haraguchi | G05B 19/408 700/86 |

(Continued)

FOREIGN PATENT DOCUMENTS

| | | |
|---|---|---|
| JP | 2011-198356 A | 10/2011 |
| JP | 2017120587 A | 7/2017 |
| JP | 201860290 A | 4/2018 |

*Primary Examiner* — Vincent H Tran
(74) *Attorney, Agent, or Firm* — Hauptman Ham, LLP

(57) ABSTRACT

A programmable controller includes a time allocation setting section for setting execution time allocation, a stage analysis section for analyzing the operation stage of a machining system, a measurement section for measuring cycle time, and a machine learning device for learning the changing of the execution time allocation to sequence programs. The machine learning device includes: a state observation section for observing execution time allocation data, operation stage data, and machine operation pattern data as a state variable; a determination data acquisition section for acquiring, as determination data, cycle time determination data for determining whether cycle time taken to execute the operation stage is appropriate; and a learning section for learning the changing of the execution time allocation in relation to the operation stage of the machining system and an operation pattern of the machine.

5 Claims, 8 Drawing Sheets

(56) References Cited

U.S. PATENT DOCUMENTS

2018/0032067 A1\* 2/2018 Maeda ............... G05B 23/0221
2018/0095438 A1\* 4/2018 Koga ................... G05B 19/291
2018/0374001 A1\* 12/2018 Namie .................. G05B 15/02
2019/0033814 A1\* 1/2019 Tscherepanow ...... G06F 9/4881

\* cited by examiner

FIG. 3

| | OPERATION STATE A | OPERATION STATE B | OPERATION STATE C | OPERATION STATE D | OPERATION STATE E |
|---|---|---|---|---|---|
| MACHINE 1 | WAITING | MACHINING | WAITING | MACHINING | MACHINING |
| MACHINE 2 | TRANSFERRING | WAITING | OPERATING | WAITING | WAITING |
| MACHINE 3 | WAITING | WAITING | MACHINING | MACHINING | WAITING |

PROGRAMMABLE CONTROLLER AND MACHINE LEARNING DEVICE

RELATED APPLICATION

The present application claims priority to Japanese Application Number 2018-100021 filed May 24, 2018, the disclosure of which is hereby incorporated by reference herein in its entirety.

BACKGROUND OF THE INVENTION

1. Field of the Invention

The present invention relates to a programmable controller and a machine learning device.

2. Description of the Related Art

A prior art machining system including a numerically controlled machine tool (NC machine tool) and peripheral devices, such as a robot and a loader, that operate around the numerically controlled machine tool, can be controlled by a single programmable controller, such as a programmable logic controller (PLC) or a programmable machine controller (PMC). The programmable controller executes a plurality of purpose-specific sequence programs, which are created in accordance with different specific purposes, by time division processing, thus controlling the devices included in the machining system (for example, Japanese Patent Application Laid-Open No. 2011-198356). In such a control method, the programmable controller allocates execution times to the respective purpose-specific sequence programs for each operation cycle, and executes the purpose-specific sequence programs for the respective allocated execution times.

Generally, devices controlled by sequence programs (for example, a sequence program for a machine tool, a sequence program for a transfer robot, a sequence program for burring, and the like) created for different specific purposes are busy at different times in a machining process.

For example, FIG. 8 illustrates sequence programs #1, #2, and #3, which are respectively used to control a numerically controlled machine tool, a workpiece transfer robot, and a burring system. Sequence programs #1, #2, and #3 are executed in order on a programmable controller while time allocation is being performed for each operation cycle. It is assumed that in the machining process, stages 1 to 6 (stages 3 to 6 in the second and subsequent cycles) be repeated, and the numerically controlled machine tool, the workpiece transfer robot, and the burring system operate in each stage as follows:

(Stage 1) The workpiece transfer robot supplies an unmachined workpiece to a machining area of the numerically controlled machine tool.

(Stage 2) The numerically controlled machine tool machines the workpiece.

(Stage 3) The workpiece transfer robot removes the machined workpiece from the machining area of the numerically controlled machine tool, and supplies the removed workpiece to a machining area of the burring system.

(Stage 4) The burring system burrs the machined workpiece while the workpiece transfer robot supplies an unmachined workpiece to the machining area of the numerically controlled machine tool.

(Stage 5) The numerically controlled machine tool machines the workpiece while the burring system continues to burr the machined workpiece.

(Stage 6) The numerically controlled machine tool machines the workpiece while the workpiece transfer robot removes the burred workpiece from the machining area of the burring system.

Sequence programs #1 to #3 are executed for respective execution times allocated on the programmable controller in each stage, which is repeated. Since the operation states of the NC machine tool, the workpiece transfer robot, and the burring system to be controlled by the respective sequence programs differ between stages, appropriate times need to be allocated to the respective sequence programs in accordance with the operation states. For example, in stage 1, since only the workpiece transfer robot operates with other machines being in waiting states, 90% of the time is allocated to the execution of sequence program #2 while less time, 5%, is allocated to each of sequence programs #1 and #3. In stage 4, since the workpiece transfer robot and the burring system operate and the monitoring of operation of the burring system is more important than the workpiece transfer robot, 25% of the time is allocated to sequence program #2, 70% is allocated to sequence program #3, and the rest, 5%, is allocated to sequence program #1.

As described above, there is a problem of appropriate changing of time allocation to programs with the timing of a stage change in accordance with the operation states of machines to be controlled, the degrees of importance of operation of the machines, and the like in each stage.

SUMMARY OF THE INVENTION

Accordingly, an object of the present invention is to provide a programmable controller and a machine learning device that can optimize time allocation to a plurality of sequence programs.

A programmable controller of the present invention solves the above-described problem by performing machine learning using a state variable including image data obtained by taking images of operation states of machines included in a machining system to be controlled, DI/DO data received from or sent to the machines, data on the coordinates of axes of the machines, and the like and determination data obtained as a result of determining processing time of stages of a machining process, and by changing execution time allocation to sequence programs for controlling the machines based on a result of the learning.

One aspect of the present invention is a programmable controller which executes a plurality of sequence programs for controlling at least one machine included in a machining system and which changes execution time allocation to the sequence programs for each operation cycle in each operation stage of the machining system. The programmable controller includes: a time allocation setting section for setting the execution time allocation; a stage analysis section for analyzing the operation stage of the machining system based on data regarding an operation state of the machine; a measurement section for measuring cycle time, the cycle time being time taken to execute the operation stage of the machining system; and a machine learning device for learning changing of the execution time allocation to the sequence programs for each operation cycle. The machine learning device includes: a state observation section for observing, as a state variable representing a current environmental state, execution time allocation data representing execution time allocation set at time of execution of the operation stage of the machining system, operation stage data representing the operation stage, and machine operation pattern data, the machine operation pattern data being data regarding the operation state of the machine in the operation stage; a determination data acquisition section for acquiring a cycle time determination data for determining whether cycle time taken to execute the operation stage executed based on the set execution time allocation is appropriate or inappropriate, as determination data representing an appropriate/inappropriate determination result for changing of the execution time allocation to the sequence programs for each operation cycle; and a learning section for learning the changing of the execution time allocation to the sequence programs for each operation cycle in relation to the operation stage of the machining system and an operation pattern of the machine using the state variable and the determination data.

Another aspect of the present invention is a programmable controller which executes a plurality of sequence programs for controlling at least one machine included in a machining system and which changes execution time allocation to the sequence programs for each operation cycle in each operation stage of the machining system. The programmable controller includes: a time allocation setting section for setting the execution time allocation; a stage analysis section for analyzing the operation stage of the machining system based on data regarding an operation state of the machine; and a machine learning device which has learned changing of the execution time allocation to the sequence programs for each operation cycle. The machine learning device includes: a state observation section for observing, as a state variable representing a current environmental state, execution time allocation data representing execution time allocation set at time of execution of the operation stage of the machining system, operation stage data representing the operation stage, and machine operation pattern data, the machine operation pattern data being data regarding the operation state of the machine in the operation stage; a learning section which has learned the changing of the execution time allocation to the sequence programs for each operation cycle in relation to the operation stage of the machining system and an operation pattern of the machine; and a decision-making section for making a decision regarding the changing of the execution time allocation to the sequence programs for each operation cycle, based on the state variable observed by the state observation section and a learning result of the learning section.

Still another aspect of the present invention is a machine learning device which is provided in a programmable controller that executes a plurality of sequence programs for controlling at least one machine included in a machining system and which learns changing of execution time allocation to the sequence programs for each operation cycle in each operation stage of the machining system. The machine learning device includes: a state observation section for observing, as a state variable representing a current environmental state, execution time allocation data representing execution time allocation set at time of execution of the operation stage of the machining system, operation stage data representing the operation stage, and machine operation pattern data, the machine operation pattern data being data regarding the operation state of the machine in the operation stage; a determination data acquisition section for acquiring cycle time determination data for determining whether cycle time taken to execute the operation stage executed based on the set execution time allocation is appropriate or inappropriate, as determination data representing an appropriate/inappropriate determination result for changing of the execution time allocation to the sequence programs for each operation cycle; and a learning section for learning the changing of the execution time allocation to the sequence programs for each operation cycle in relation to the operation stage of the machining system and an operation pattern of the machine using the state variable and the determination data.

Yet another aspect of the present invention is a machine learning device which is provided in a programmable controller that executes a plurality of sequence programs for controlling at least one machine included in a machining system and which has learned changing of execution time allocation to the sequence programs for each operation cycle in each operation stage of the machining system. The machine learning device includes: a state observation section for observing, as a state variable representing a current environmental state, execution time allocation data representing execution time allocation set at time of execution of the operation stage of the machining system, operation stage data representing the operation stage, and machine operation pattern data, the machine operation pattern data being data regarding the operation state of the machine in the operation stage; a learning section which has learned the changing of the execution time allocation to the sequence programs for each operation cycle in relation to the operation stage of the machining system and an operation pattern of the machine; and a decision-making section for making a decision regarding the changing of the execution time allocation to the sequence programs for each operation cycle, based on the state variable observed by the state observation section and a learning result of the learning section.

With the present invention, execution time allocation to a plurality of sequence programs can be optimized, and the throughput of the entire system can be increased. Further, when the sequence programs to be used are changed, relearning by machine learning is performed to optimize the execution time allocation.

BRIEF DESCRIPTION OF THE DRAWINGS

These and other objects and features of the present invention will become apparent from the following description of an exemplary embodiment with reference to the accompanying drawings in which:

FIG. 3 is a view illustrating an operation state analysis result table;

DETAILED DESCRIPTION OF THE PREFERRED EMBODIMENT

Hereinafter, an embodiment of the present invention will be described with reference to the drawings.

Figure 1:
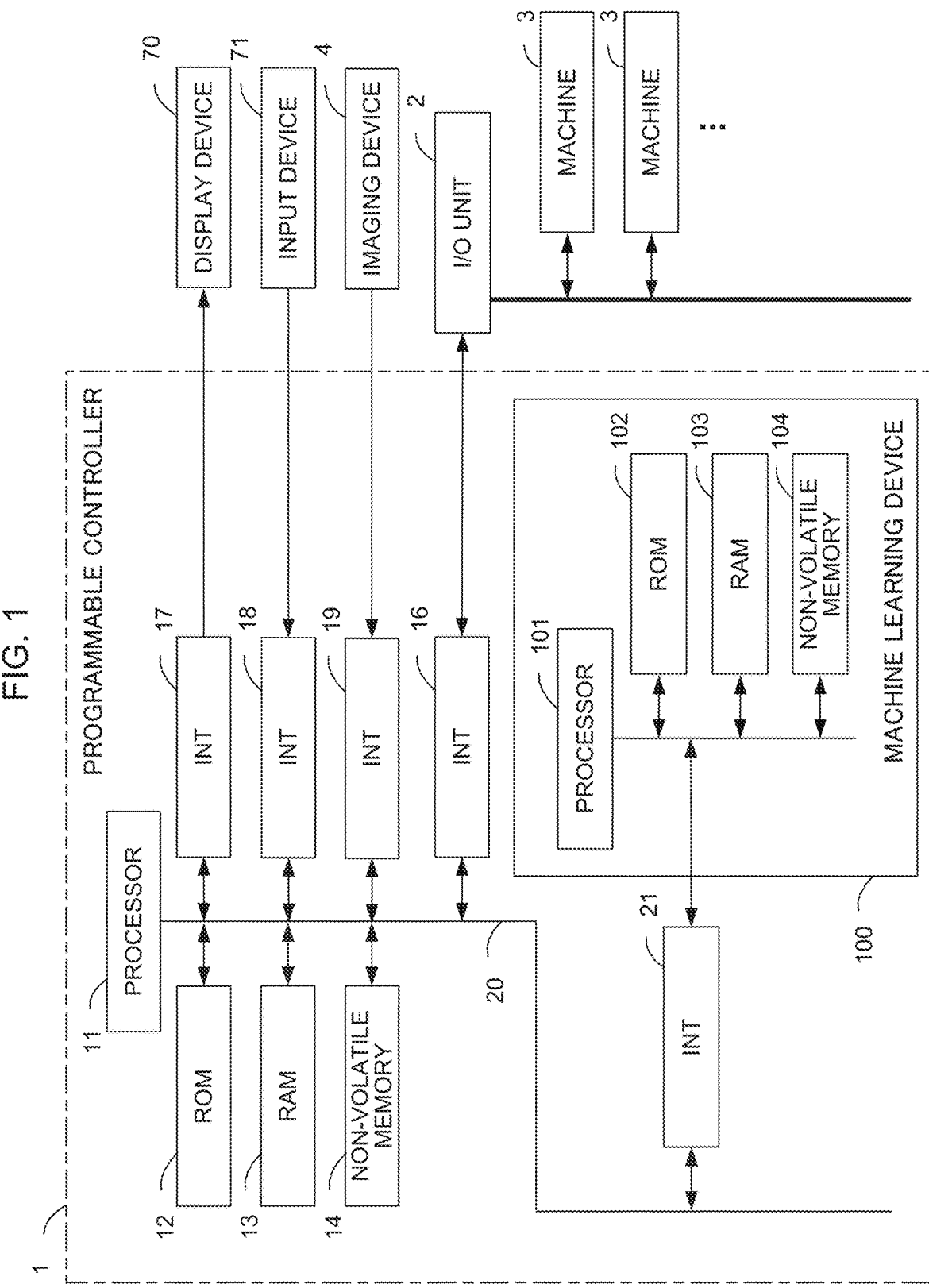
FIG. 1 is a hardware configuration diagram schematically illustrating a programmable controller according to one embodiment.

FIG. 1 is a hardware configuration diagram schematically illustrating principal portions of a programmable controller according to one embodiment.

A processor 11 included in a programmable controller 1 according to the present embodiment is a processor for entirely controlling the programmable controller 1. The processor 11 reads out a system program stored in a ROM 12 via a bus 20 and controls the whole of the programmable controller 1 in accordance with the system program. A RAM 13 temporarily stores data such as temporary calculation data, display data, and various kinds of data inputted by an operator through an input device 71 such as a mouse, a keyboard, or the like.

A non-volatile memory 14 is backed up by a battery, which is not shown, for example, and thus, the non-volatile memory 14 is configured as a memory whose storage state is maintained even when the programmable controller 1 is turned off. The non-volatile memory 14 stores setting areas storing setting information regarding the operation of the programmable controller 1, programs inputted from the input device 71, programs read from an unillustrated external storage device, image data acquired from an imaging device 4 through an interface 19, and various kinds of data (for example, DI/DO data inputted to or outputted from each of machines 3, the coordinate values of axes of each machine 3, and the like) received from or sent to machines 3 included in a machining system to be controlled through an I/O unit 2, which is connected to an interface 16. Such programs and various kinds of data stored in the non-volatile memory 14 may be loaded into the RAM 13 at the time of execution or use. The ROM 12 has various kinds of pre-written system programs (including a system program for controlling data exchange with a machine learning device 100, which will be described later) such as a publicly-known analysis program.

The programmable controller 1 sends DI data (such as input signals from the machines 3) to and receives DO data (such as output signals to the machines 3) from the machines 3 through the I/O unit 2, which is connected to the interface 16, thus controlling the machines 3.

A display device 70 receives, for example, each piece of data loaded into a memory, data obtained as a result of the execution of a program or the like, and data outputted from the machine learning device 100, which will be described later, through an interface 17 and displays such data. The input device 71, which includes a keyboard, a pointing device, and the like, receives a command based on an action of an operator, data, and the like, and passes the command, the data, and the like to the processor 11 through an interface 18.

The imaging device 4 takes an image of the operation state of each machine 3 included in the machining system to be controlled by the programmable controller 1, and passes the obtained image data to the processor 11 through the interface 19. The image data taken by the imaging device 4 may be a moving image or may be a plurality of still images consecutively taken with a predetermined period. Images of the operation states of all the machines 3 included in the machining system may be taken by a single imaging device 4, or images representing the operation state of the entire machining system may be taken by imaging devices 4 disposed for the respective machines 3. It should be noted that the imaging device 4 is not necessarily an essential component if image data are not used to identify the operation states of the machines 3.

An interface 21 is an interface for connecting the programmable controller 1 with the machine learning device 100. The machine learning device 100 includes a processor 101 that entirely controls the machine learning device 100, a ROM 102 that stores system programs and the like, a RAM 103 that performs temporary storage in each processing related to machine learning, and a non-volatile memory 104 that is used for storing learning models and the like. The machine learning device 100 can observe each piece of information (for example, image data acquired from the imaging device 4, DI/DO data inputted to or outputted from each of machines 3, the coordinate values of axes of each machine 3, and the like) that the programmable controller 1 can acquire through the interface 21. Upon receiving a command outputted from the machine learning device 100, the programmable controller 1 changes time allocation to sequence programs for each operation cycle.

Figure 2:
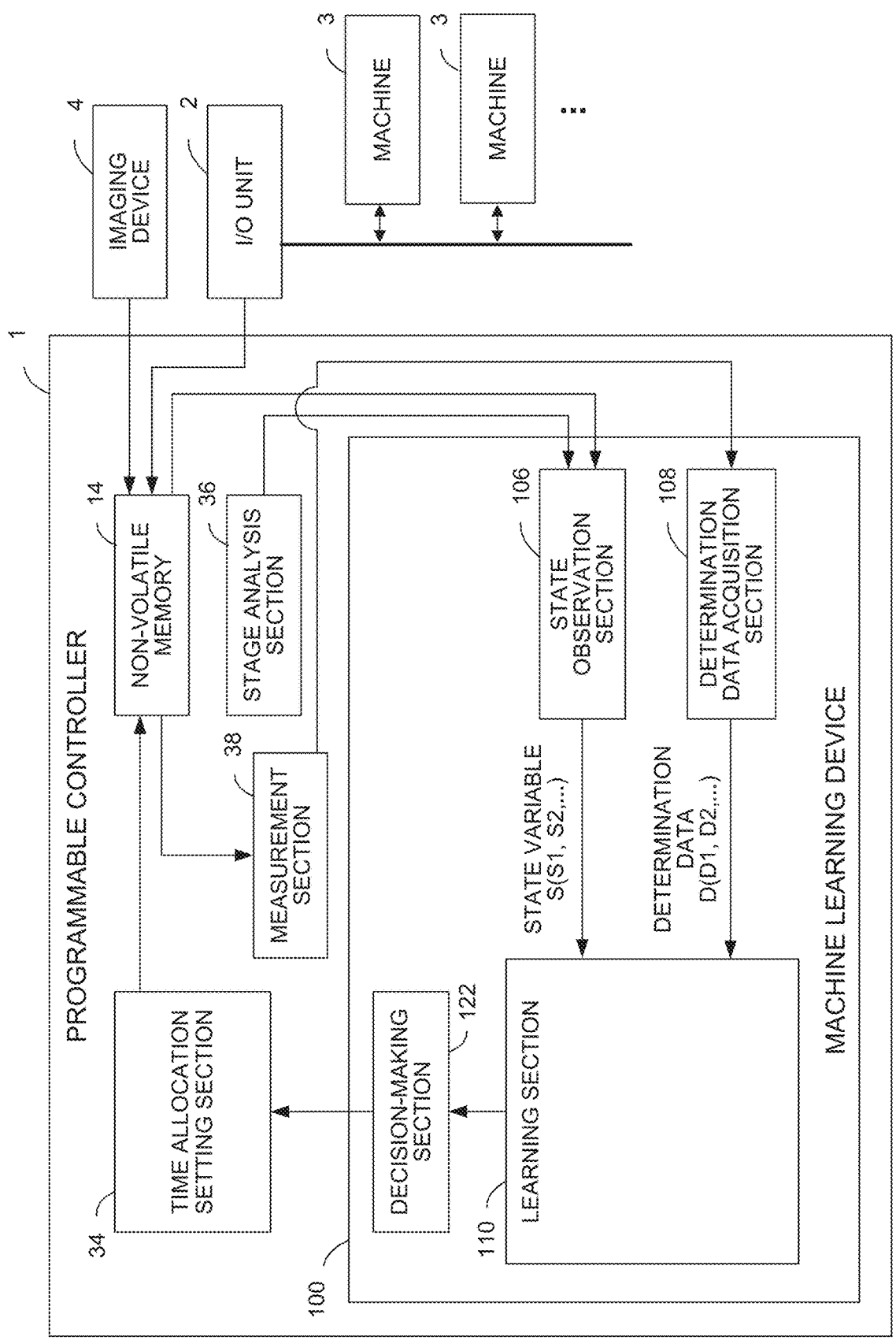
FIG. 2 is a functional block diagram schematically illustrating the programmable controller according to the embodiment.

FIG. 2 is a functional block diagram schematically illustrating the programmable controller 1 and the machine learning device 100 according to one embodiment. Functional blocks illustrated in FIG. 2 are realized when the processor 11 included in the programmable controller 1 and the processor 101 of the machine learning device 100 which are illustrated in FIG. 1 execute respective system programs and respectively control an operation of each section of the programmable controller 1 and the machine learning device 100.

The programmable controller 1 of the present embodiment includes a time allocation setting section 34, a stage analysis section 36, and a measurement section 38. The time allocation setting section 34 receives a command to change execution time allocation to the sequence programs for each operation cycle outputted from the machine learning device 100, and then sets execution time allocation to the sequence programs for each operation cycle set in an execution time allocation setting area in the non-volatile memory 14. The stage analysis section 36 analyzes the current operation stage of the machining system based on the respective operation states of the machines 3. The measurement section 38 measures the cycle time of each stage.

The time allocation setting section 34 sets execution time allocation to a plurality of purpose-specific sequence programs to be executed by the programmable controller 1 for each operation cycle, for example, in percentage (%), priority (for example, high, middle, and low), or the like, in accordance with the command to change the execution time allocation to the sequence programs for each operation cycle outputted from the machine learning device 100.

The stage analysis section 36 analyzes DI/DO data received from or sent to the machines 3 through the I/O unit 2, the coordinate values of the axes of the machines 3, image data obtained by the imaging device 4 taking images of the machines 3, and the like, such data being recorded in the non-volatile memory 14, identifies the respective operation states of the machines 3, and identifies the operation state of the entire machining system including the machines 3 based on the combination of the operation states. The stage analysis section 36 may identify the current operation state of each machine 3 based on, for example, the input/output status of DI/DO data (for example, the output status of a signal indicating that the machine 3 is machining, whether a signal for instructing the machine 3 to start/stop operating has been outputted, and the like). Alternatively, the stage analysis section 36 may identify the current operation state of each machine 3 based on the coordinate values of the axes of the machine 3 or changes in the coordinate values. Alternatively, the stage analysis section 36 may identify the operation state of each machine 3 based on, for example, a result of image analysis which the stage analysis section 36 performs to find a characteristic portion in the image data that indicates the operation state of the machine 3 (a lamp for indicating safety or the like during machining, the position or movement of a specific actuator, for example, the open/close status of a door or the movement of a main spindle or an arm, or the like). Alternatively, the stage analysis section 36 may identify the operation state of each machine 3 with greater accuracy using a combination of ways described above. Operation states of each machine 3 include at least two states, operating and waiting, and preferably further include states in accordance with the meanings of operation states, such as machining, transferring, and stopping. The operation state of each machine 3 generally changes to the next operation state at a temporal boundary, such as a change in DI/DO data or the series of DI/DO data, the coordinate value of an axis of the machine 3, or image data, which triggers the change in the operation state. Accordingly, conditions in which the operation state of each machine 3 changes are set in advance, such as changes in DI/DO data or the series of DI/DO data, the coordinate values of the axes of the machine 3, and image data. When a set condition is satisfied, it is determined that the operation state changes. Based on this determination, the operation state at any given point in time can be identified. Thus, the stage analysis section 36 identifies the operation state of the machining system based on the combination of the operation states of the machines 3. With respect to identified operation states of the machining system, the stage analysis section 36 creates an operation state analysis result table, such as illustrated in FIG. 3, in which information for identifying operation states of the machining system and operation states of the machines 3 are associated with each other and a history of operation states of the machining system since the start of operation of the machining system, and stores the operation state analysis result table and the history in the non-volatile memory 14.

Figure 4:
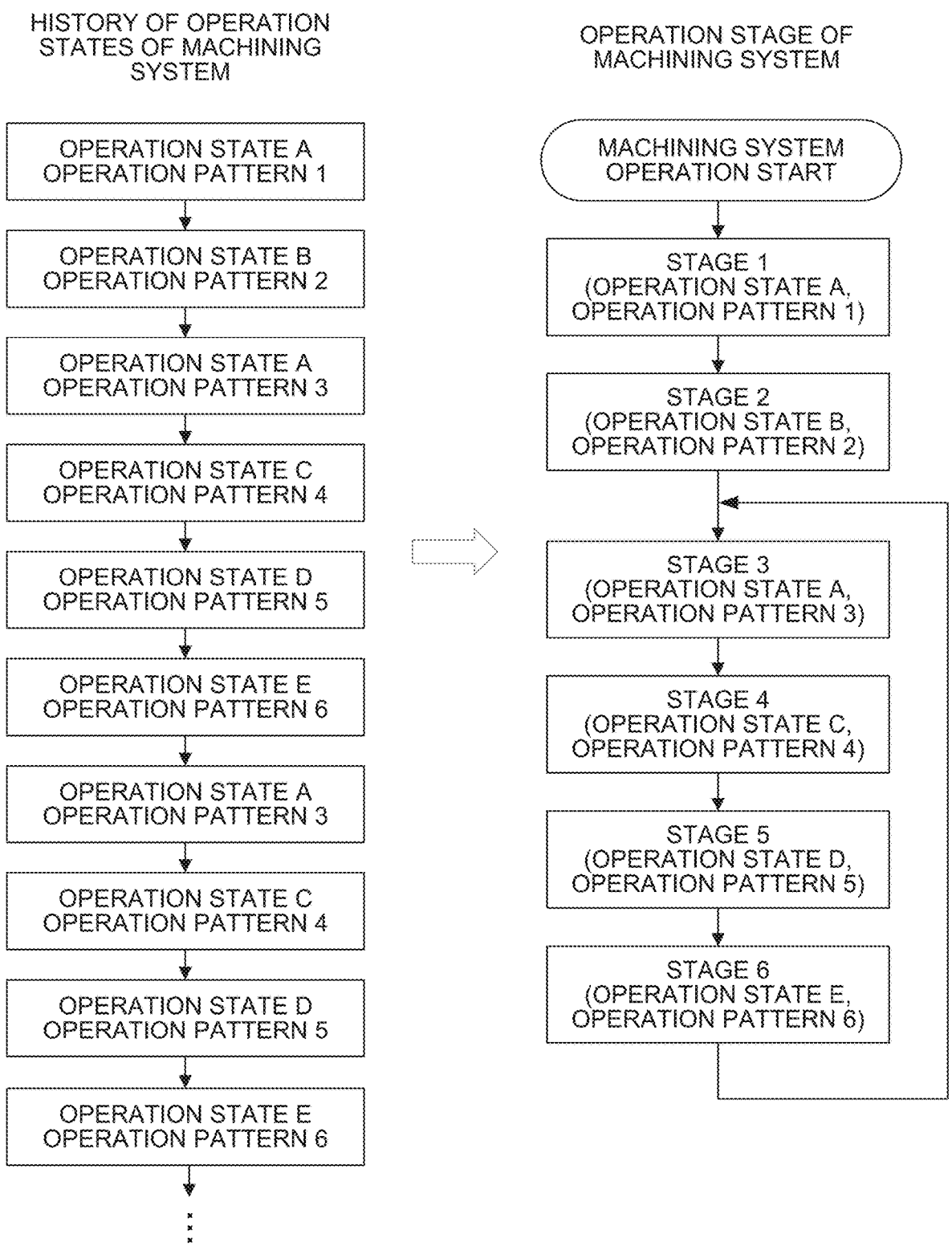
FIG. 4 is a diagram illustrating a history of operation states of a machining system and operation stages of the machining system identified from the history of operation states.

Next, the stage analysis section 36 identifies operation stages of the machining system based on the history of the operation states of the machining system since the start of operation of the machining system and operation patterns identified from the series of the input/output status of DI/DO data in each operation state, the series of the coordinate values of the axes of each machine 3, the series of changes in a characteristic portion indicating the operation state of each machine 3 in image data, and the like. FIG. 4 is a view illustrating an example that includes a history of operation states of the machining system and operation stages of the machining system identified from the history of the operation states. The stage analysis section 36 regards, as the same operation stage, operation states of the machining system which are identical and which have similar operation patterns. For example, in FIG. 4, the third and seventh operation states from the start of operation of the machining system are the same operation state of the machining system and have identical (similar) operation patterns. These operation states are determined to be in the same operation stage. The first and third operation states from the start of operation of the machining system are the same operation state of the machining system but have different operation patterns. These operation states are determined to be in different operation stages. With respect to each operation stage of the machining system thus identified, the stage analysis section 36 stores the input/output status of DI/DO data, the coordinate values of the axes of the machines 3, image data, and the like in the non-volatile memory 14 in an organized form.

For each operation stage of the machining system, the measurement section 38 measures the time taken to perform the operation stage. The measurement section 38 stores the measured time taken to perform each operation stage in the non-volatile memory 14 as a history.

Meanwhile, the machine learning device 100 included in the programmable controller 1 includes software (such as a learning algorithm) and hardware (such as the processor 101) with which the machine learning device 100 itself learns the changing of execution time allocation to the sequence programs for each operation cycle with respect to the operation stage of the machining system by so-called machine learning. What the machine learning device 100 included in the programmable controller 1 learns corresponds to a model structure representing the correlation between the operation stage of the machining system and the changing of the execution time allocation to the sequence programs for each operation cycle.

As represented by functional blocks in FIG. 2, the machine learning device 100 included in the programmable controller 1 includes a state observation section 106, a determination data acquisition section 108, and a learning section 110. The state observation section 106 observes, as a state variable S representing the current environmental state, execution time allocation data S1 representing execution time allocation, operation stage data S2 representing the operation stage of the machining system, and machine operation pattern data S3 representing the operation pattern of the machines 3 included in the machining system in the operation stage. The determination data acquisition section 108 acquires determination data D including cycle time determination data D1 for determining the cycle time taken to perform the operation stage of the machining system with the machines 3 included in the machining system being controlled based on set execution time allocation. The learning section 110 learns the changing of the execution time allocation to the sequence programs for each operation cycle in relation to the operation stage of the machining system and the operation pattern of the machines 3 using the state variable S and the determination data D.

Of the state variable S observed by the state observation section 106, the execution time allocation data S1 can be acquired as execution time allocation changed based on a command, outputted by the machine learning device 100, to change the execution time allocation to the sequence programs for each operation cycle. As described previously, the execution time allocation can be set in, for example, percentage (%) of execution time, priority (high, middle, low), or the like for each operation cycle. Accordingly, the command to change the execution time allocation may be a command to directly specify the execution time allocation for each operation cycle or a command to adjust the execution time allocation for each operation cycle (increase/decrease percentage by 5%, increase/decrease priority by one level, or the like).

The execution time allocation that the machine learning device 100 has set based on a result of learning by the learning section 110 in the last learning period can be used as the execution time allocation data S1 without change. In the case where such an approach is used, the machine learning device 100 may temporarily store the set execution time allocation in the RAM 103 for each learning period, and the state observation section 106 may acquire the execution time allocation changed in the last learning period as the execution time allocation data S1 for the current learning period from the RAM 103.

Of the state variables S observed by the state observation section 106, the operation stage data S2 can be acquired as the operation stage of the machining system in the last learning period.

Of the state variables S observed by the state observation section 106, the machine operation pattern data S3 can be acquired as the series of the input/output status of DI/DO data of each machine 3, the series of the coordinate values of the axes of each machine 3, the series of changes in a characteristic portion indicating the operation state of each machine 3 in image data, and the like in the operation stage of the machining system in the last learning period.

As such data, at the time of learning, data recorded in an organized form in the non-volatile memory 14 by the stage analysis section 36 can be used. At the time of estimation, after determining similarity between the respective series of the input/output status of DI/DO data, the coordinate values of the axes, image data, and the like acquired from each machine 3 included in the machining system and data on the operation stages recorded in the non-volatile memory 14, data determined to be similar can be acquired from the non-volatile memory 14.

The determination data acquisition section 108 can use, as the cycle time determination data D1, a result of determination for a measurement value obtained by the measurement section 38 measuring the time (that is, cycle time) taken to perform an operation stage when the machining system is operated based on the set execution time allocation. The cycle time determination data D1 that the determination data acquisition section 108 uses may be, for example, data on whether the time taken to perform the same operation stage of the machining system is reduced (appropriate) or increased (inappropriate) before and after changing the execution time allocation.

It should be noted that the determination data acquisition section 108 is an essential component in a phase in which the learning section 110 is learning, but is not necessarily an essential component after the learning section 110 completes learning the changing of the execution time allocation to the sequence programs for each operation cycle in relation to the operation states of the machines 3.

From the perspective of learning periods of the learning section 110, the state variables S simultaneously inputted to the learning section 110 are based on data acquired in the last learning period. Thus, during a period in which the machine learning device 100 included in the programmable controller 1 is learning, the following is repeatedly carried out in the environment: the setting (changing) of the execution time allocation to the sequence programs in a predetermined operation stage of the machining system, the measurement of cycle time by the measurement section 38 during the execution of the operation stage, determination as to whether the cycle time measured by the measurement section 38 in the operation stage is appropriate or inappropriate, and learning based on these pieces of data.

The learning section 110 learns the operation stage of the machining system, the operation pattern of the machines 3, and the changing of the execution time allocation to the sequence programs for each operation cycle in accordance with a freely-selected learning algorithm generically called machine learning. The learning section 110 can repeatedly execute learning based on a data collection containing the state variables S and the determination data D previously described.

By repeating the above-described learning cycle, the learning section 110 becomes capable of identifying features implying the correlation of the changing of the execution time allocation to the sequence programs for each operation cycle with the operation stage of the machining system and the operation pattern of the machines 3. When the learning algorithm is started, the correlation of the changing of the execution time allocation to the sequence programs for each operation cycle with the operation stage of the machining system and the operation pattern of the machines 3 is substantially unknown. The learning section 110, however, gradually identifies features and interprets the correlation as learning progresses. When the correlation of the changing of the execution time allocation to the sequence programs for each operation cycle with the operation stage of the machining system and the operation pattern of the machines 3 is interpreted to some reliable level, learning results repeatedly outputted by the learning section 110 become capable of being used to select an action (that is, make a decision) regarding how the execution time allocation to the sequence programs for each operation cycle should be changed with respect to the current state (that is, the operation stage of the machining system and the operation pattern of the machines 3). Specifically, as the learning algorithm progresses, of learning section 110 can gradually bring the correlation of the changing of the execution time allocation to the sequence programs for each operation cycle with the operation stage of the machining system and the operation pattern of the machines 3, that is, an action regarding how the execution time allocation to the sequence programs for each operation cycle should be changed with respect to the operation stage of the machining system and the operation pattern of the machines 3, close to the optimal solution.

The decision-making section 122 determines the changing of the execution time allocation to the sequence programs for each operation cycle based on the state variable S and a learning result of the learning section 110, and outputs a command to change the execution time allocation to the sequence programs for each operation cycle to the time allocation setting section 34 so as to perform the determined changing of the execution time allocation to the sequence programs for each operation cycle.

As described previously, in the machine learning device 100 included in the programmable controller 1, the learning section 110 learns the changing of the execution time allocation to the sequence programs for each operation cycle with respect to the operation stage of the machining system and the operation pattern of the machines 3 in accordance with a machine learning algorithm using the state variables S observed by the state observation section 106 and the determination data D acquired by the determination data acquisition section 108. The state variables S include data such as the execution time allocation data S1, the operation stage data S2, and the machine operation pattern data S3. The determination data D can be unambiguously found from the cycle time measured in an operation stage in which the machining system is actually operated. Accordingly, with the machine learning device 100 included in the programmable controller 1, the execution time allocation to the sequence programs for each operation cycle can be automatically and accurately changed with respect to the operation stage of the machining system and the operation pattern of the machines 3 using a learning result of the learning section 110.

Further, if optimal changing of the execution time allocation to the sequence programs for each operation cycle can be automatically performed, the execution time allocation to the sequence programs for each operation cycle can be quickly changed to an appropriate state only by obtaining data observed in the machines 3 included in the machining system.

Figure 5:
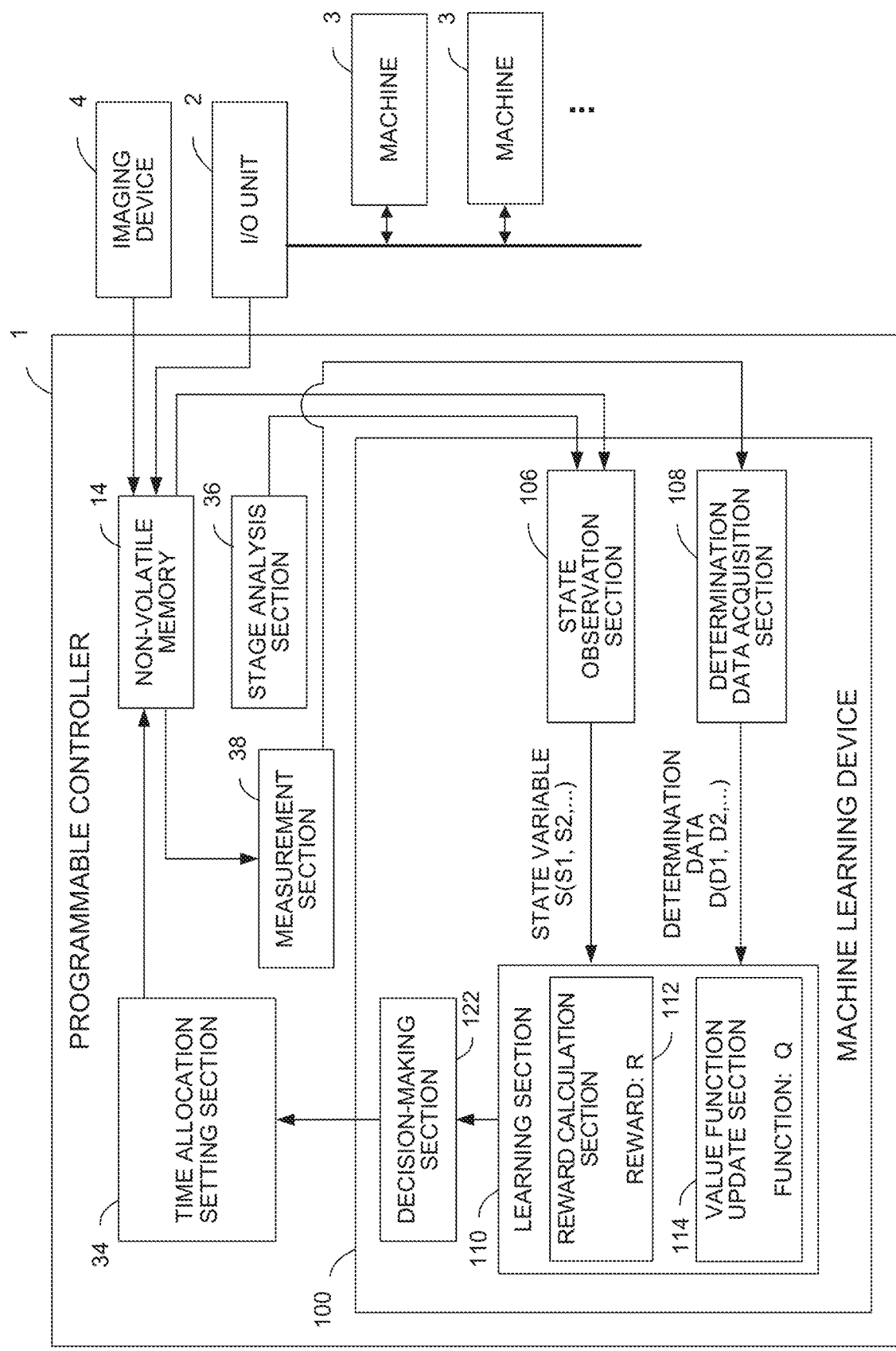
FIG. 5 is a functional block diagram schematically illustrating one aspect of the programmable controller.

In the machine learning device 100 included in the programmable controller 1 illustrated in FIG. 5, the learning section 110 includes a reward calculation section 112 and a value function update section 114. The reward calculation section 112 finds a reward R relating to a result (corresponding to the determination data D to be used in a learning period) of determination as to whether a result of operating the machining system based on the set execution time allocation to the sequence programs for each operation cycle is appropriate or inappropriate. The value function update section 114 updates a function Q representing the value of the execution time allocation using the reward R. The learning section 110 learns the changing of the execution time allocation to the sequence programs for each operation cycle with respect to the operation stage of the machining system and the operation pattern of the machines 3 by the value function update section 114 repeating the update of the function Q.

One example of a reinforcement learning algorithm that the learning section 110 executes will be described. The algorithm according to this example is known as Q-learning and is an approach in which using, as independent variables, the state s of an agent and an action a that the agent can select in the state s, a function Q(s, a) representing the value of the action in the case where the action a is selected in the state s is learned. Selecting such an action a that the value function Q becomes maximum in the state s is the optimal solution. By starting Q-learning in a state in which the correlation between the state s and the action a is unknown and repeating trial and error in which various actions a are selected in arbitrary states s, the value function Q is repeatedly updated to be brought close to the optimal solution. The value function Q can be brought close to the optimal solution in a relatively short time by employing a configuration in which when an environment (that is, the state s) changes as a result of selecting the action a in the state s, a reward r (that is, a weight given to the action a) corresponding to the change can be obtained, and guiding learning so that an action a yielding a higher reward r may be selected.

An update formula for the value function Q is generally represented as the following Formula 1. In Formula 1, $s_t$ and $a_t$ are respectively a state and an action at time t. The action at changes the state to $s_{t+1}$. $r_{t+1}$ is a reward obtained in response to a change of the state from $s_t$ to $s_{t+1}$. The term of maxQ means Q obtained when an action a that provides a maximum value Q (seems at time t to provide a maximum value Q) is taken at time t+1. α and γ are respectively a learning coefficient and a discount rate, and are set as desired in the range of 0<α≤1 and 0<γ≤1.

$$Q(s_t, a_t) \leftarrow Q(s_t, a_t) + \alpha \left( r_{t+1} + \gamma \max_a Q(s_{t+1}, a) - Q(s_t, a_t) \right)$$ [Formula 1]

In the case where the learning section 110 executes Q-learning, the state variable S observed by the state observation section 106 and the determination data D acquired by the determination data acquisition section 108 correspond to the state s in the update formula, an action regarding how the execution time allocation to the sequence programs for each operation cycle should be changed with respect to the current state (that is, the operation stage of the machining system and the operation pattern of the machines 3) corresponds to the action a in the update formula, and the reward R found by the reward calculation section 112 corresponds to the reward r in the update formula. Accordingly, the value function update section 114 repeatedly updates the function Q representing the value of the execution time allocation with respect to the current state by Q-learning using the reward R.

The reward R found by the reward calculation section 112 may be set as follows: for example, after the execution time allocation to the sequence programs for each operation cycle is changed, if a result of operating the machining system based on the changed execution time allocation is determined to be "appropriate" (for example, if the cycle time becomes shorter than in the same operation stage before the execution time allocation is changed), the reward R is positive (plus); and, after the execution time allocation to the sequence programs for each operation cycle is changed, if a result of operating the machining system based on the changed execution time allocation is determined to be "inappropriate" (for example, if the cycle time becomes longer than in the same operation stage before the execution time allocation is changed), the reward R is negative (minus). The absolute values of the positive and negative rewards R may be equal or different. With regard to criteria for determination, a plurality of values contained in the determination data D may be combined to make a determination.

Moreover, results of determination as to whether the machining of a workpiece based on the changed execution time allocation is appropriate or inappropriate may be classified into a plurality of grades, not only two grades, "appropriate" and "inappropriate". For example, reward R=5 is given if the cycle time T of the operation of the machining system based on the changed execution time allocation is reduced by not less than 5% of the cycle time $T_p$ before the change, reward R=3 is given if reduced by not less than 3% and less than 5% thereof, reward R=1 is given if reduced by not less than 0% and less than 3% thereof, and reward R=−3 (minus reward) is given if the cycle time increases.

Further, a threshold for use in determination may be set relatively large in the initial phase of learning, and may decrease as learning progresses.

The value function update section 114 may have an action-value table in which the state variables S, the determination data D, and the reward R are organized in relation to action values (for example, numerical values) represented by the function Q. In this case, the action that the value function update section 114 updates the function Q is synonymous with the action that the value function update section 114 updates the action-value table. When the Q-learning is started, the correlation between the current environmental state and the changing of the execution time allocation to the sequence programs for each operation cycle is unknown. Accordingly, in the action-value table, various sets of the state variable S, the determination data D, and the reward R are prepared in a form in which they are associated with randomly determined values (function Q) of action value. It should be noted that if the determination data D is known, the reward calculation section 112 can immediately calculate a reward R corresponding to the determination data D, and the calculated value R is written to the action-value table.

As the Q-learning is advanced using the reward R corresponding to a result of determination as to whether a result of a simulation is appropriate or inappropriate, learning is guided in the direction in which an action yielding a higher reward R is selected, the value (function Q) of action value of an action that is performed in the current state is rewritten in accordance with the state (that is, the state variable S and the determination data D) of the environment that is changed as the result of execution of the selected action in the current state, and the action-value table is thus updated. By repeating this update, the values (function Q) of action values displayed in the action-value table are rewritten so as to increase with increasing appropriateness of actions (in the present invention, appropriate actions are actions to change the execution time allocation to the sequence programs for each operation cycle so that the cycle time of each operation stage of the machining system may be reduced). This gradually reveals the correlation, which has been unknown, between the current environmental state (the operation stage of the machining system and the operation pattern of the machines 3) and an action (changing the execution time allocation to the sequence programs for each operation cycle) with respect to the current environmental state. In other words, by updating the action-value table, the relationship of the changing of the execution time allocation to the sequence programs for each operation cycle with the operation stage of the machining system and the operation pattern of the machines 3 is gradually brought close to the optimal solution.

Figure 6:
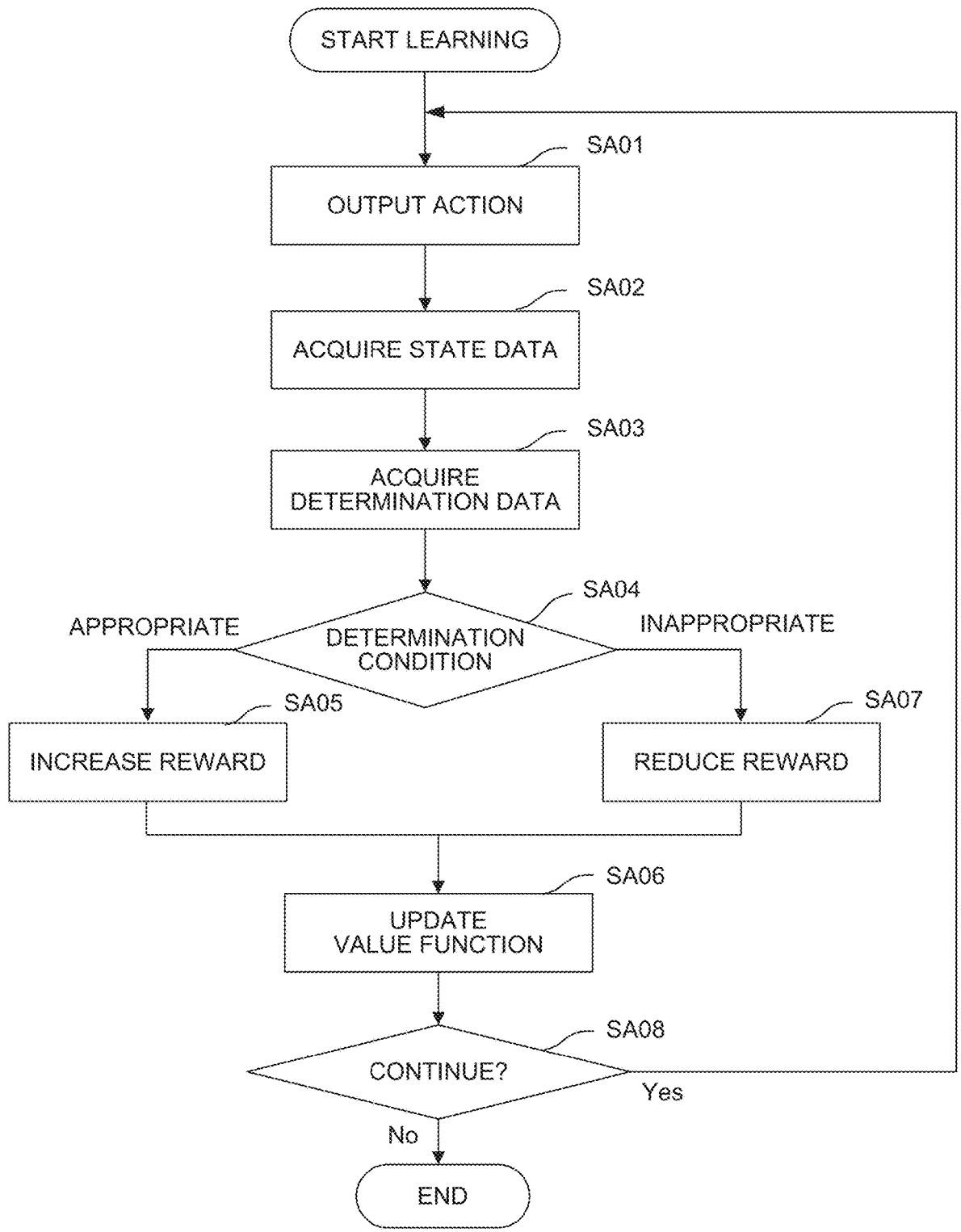
FIG. 6 is a flowchart schematically illustrating one aspect of a machine learning method.

Referring to FIG. 6, the flow (that is, one aspect of the machine learning method) of the above-described Q-learning that the learning section 110 executes will be further described. First, in step SA01, the value function update section 114 randomly selects an action to change the execution time allocation to the sequence programs for each operation cycle as an action to be taken in the current state represented by the state variable S observed by the state observation section 106, with reference to the action-value table at that time. Next, in step SA02, the value function update section 114 takes in the state variable S of the current state that the state observation section 106 is observing. Then, in step SA03, the value function update section 114 takes in the determination data D of the current state that the determination data acquisition section 108 has acquired. Next, in step SA04, the value function update section 114 determines, based on the determination data D, whether the cycle time of the operation stage of the machining system based on the changed execution time allocation has been appropriate. If it has been determined that the cycle time has been appropriate, the value function update section 114, in step SA05, applies a positive reward R found by the reward calculation section 112 to the update formula of the function Q, and then, in step SA06, updates the action-value table using the state variable S and the determination data D in the current state, the reward R, and the value (function Q after update) of action value. If it has been determined in step SA04 that the cycle time of the operation stage of the machining system based on the changed execution time allocation has not been appropriate, the value function update section 114, in step SA07, applies a negative reward R found by the reward calculation section 112 to the update formula of the function Q, and then, in step SA06, updates the action-value table using the state variable S and the determination data D in the current state, the reward R, and the value (function Q after update) of action value. The learning section 110 repeatedly updates the action-value table by repeating steps SA01 to SA07, thus advancing the learning of the changing of the execution time allocation to the sequence programs for each operation cycle. It should be noted that the process for finding the reward R and updating the value function from step SA04 to step SA07 is executed for each piece of data contained in the determination data D.

Figure 7A:
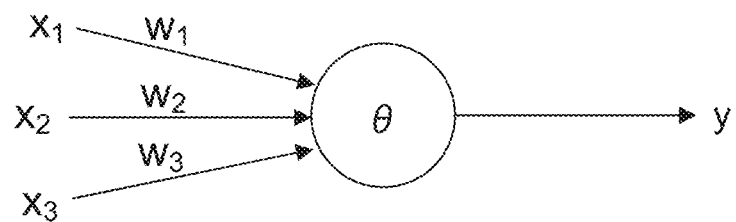
FIG. 7A is a diagram for explaining a neuron.
Figure 7B:
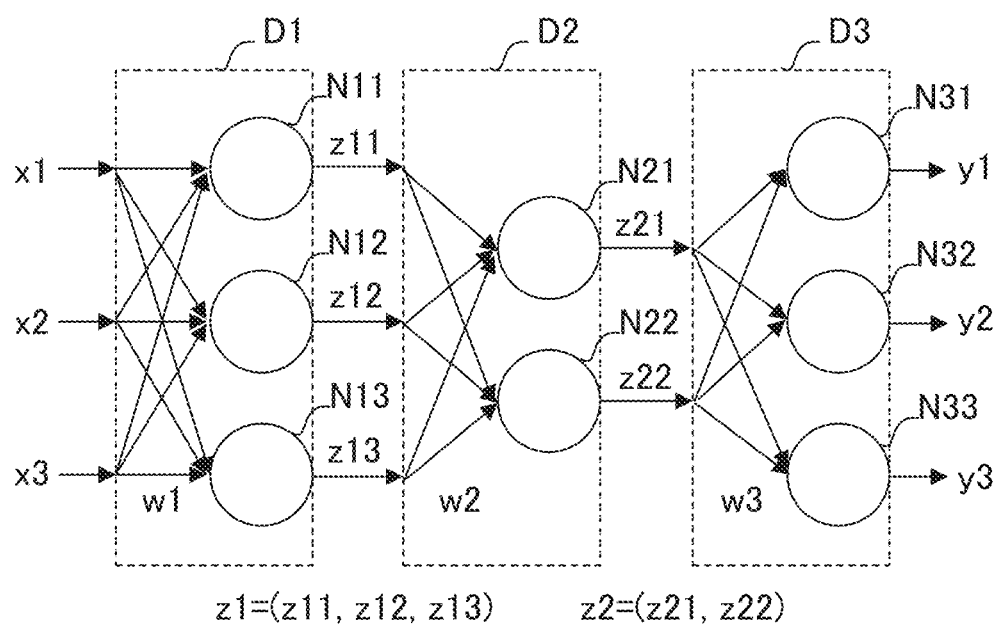
FIG. 7B is a diagram for explaining a neural network.
Figure 8:
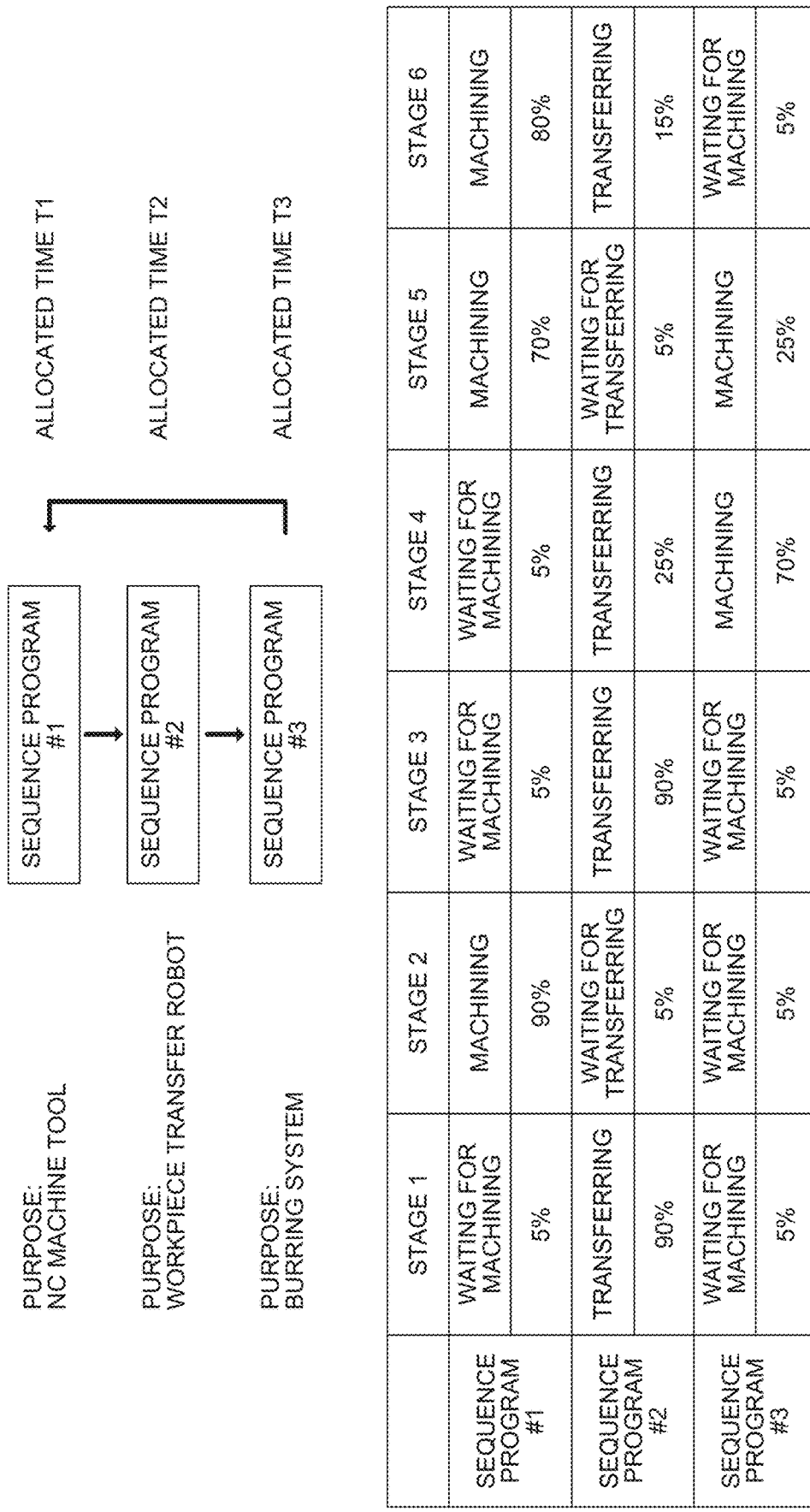
FIG. 8 is a view for explaining execution time allocation to sequence programs in a programmable controller for each operation cycle.

To advance the aforementioned reinforcement learning, for example, a neural network can be applied. FIG. 7A schematically illustrates a model of a neuron. FIG. 7B schematically illustrates a model of a three-layered neural network which is configured by combining the neurons illustrated in FIG. 7A. The neural network can be composed of arithmetic devices, storage devices, or the like, for example, in imitation of the model of neurons.

The neuron illustrated in FIG. 7A outputs a result y with respect to a plurality of inputs x (input $x_1$ to input $x_3$ as an example here). Inputs $x_1$ to $x_3$ are respectively multiplied by weights w ($w_1$ to $w_3$) corresponding to these inputs x. Accordingly, the neuron outputs the output y expressed by Formula 2 below. Here, in Formula 2, all of input x, output y, and weight w are vectors. Further, $\theta$ denotes a bias and $f_k$ denotes an activation function.

$$y = f_k(\Sigma_{i=1}^n x_i w_i - \theta) \quad \text{[Formula 2]}$$

In the three-layered neural network illustrated in FIG. 7B, a plurality of inputs x (input x1 to input x3 as an example here) are inputted from the left side and results y (result y1 to result y3 as an example here) are outputted from the right side. In the example illustrated in FIG. 7B, inputs x1, x2, x3 are each multiplied by corresponding weights (collectively denoted by w1) and each of inputs x1, x2, x3 is inputted into three neurons N11, N12, N13.

In FIG. 7B, an output of each of the neurons N11, N12, N13 is collectively denoted by z1. z1 can be considered as a feature vector obtained by extracting a feature amount of an input vector. In the example illustrated in FIG. 7B, feature vectors z1 are each multiplied by corresponding weights (collectively denoted by w2) and each of feature vectors z1 is inputted into two neurons N21, N22. Feature vector z1 represents a feature between weight w1 and weight w2.

In FIG. 7B, an output of each of the neurons N21, N22 is collectively denoted by z2. z2 can be considered as a feature vector obtained by extracting a feature amount of feature vector z1. In the example illustrated in FIG. 7B, feature vectors z2 are each multiplied by corresponding weights (collectively denoted by w3) and each of feature vectors z2 is inputted into three neurons N31, N32, N33. Feature vector z2 represents a feature between weight w2 and weight w3. Finally, neurons N31 to N33 respectively output results y1 to y3.

Here, the method of so-called deep learning in which a neural network having three or more layers is used may be employed as well.

In the machine learning device 100 provided in the programmable controller 1, the learning section 110 can use a neural network as a value function in Q-learning to perform multi-layer calculation following the above-described neural network using the state variable S and the action a as the input x, thus outputting the value (result y) of the action in the state. It should be noted that operation modes of the neural network include a learning mode and a value prediction mode. For example, weights w are learned using a learning data set in the learning mode, and the value of an action can be determined using the learned weights w in the value prediction mode. It should be noted that in the value prediction mode, detection, classification, inference, and the like can also be performed.

The above-described configuration of the programmable controller 1 can be described as a machine learning method (or software) that the processor 101 executes. This machine learning method is a machine learning method for learning the changing of the execution time allocation to the sequence programs for each operation cycle, and includes: a step of observing the execution time allocation data S1, the operation stage data S2, and the machine operation pattern data S3 as the state variable S representing the current state of the environment in which the machining system operates; a step of acquiring the determination data D representing a result of determination as to whether the cycle time of the operation stage of the machining system based on the changed execution time allocation is appropriate or inappropriate; and a step of learning the changing of the execution time allocation to the sequence programs for each operation cycle in relation to the operation stage data S2 and the machine operation pattern data S3 using the state variable S and the determination data D. In this method, the steps are performed by a CPU of a computer.

The embodiment of the present invention has been described above, but the present invention can be embodied in various aspects by adding arbitrary alterations, without being limited only to the examples of the above-described embodiment.

For example, the learning algorithm and the arithmetic algorithm that the machine learning device 100 executes, the control algorithm that the programmable controller 1 executes, and the like are not limited to the above-described ones, and various algorithms can be employed.

The above-described embodiment includes the description that the programmable controller 1 and the machine learning device 100 are devices including CPUs different from each other, but the machine learning device 100 may be realized by the processor 11 included in the programmable controller 1 and the system program stored in the ROM 12.

The embodiment of the present invention has been described above, but the present invention can be embodied in other aspects by adding arbitrary alterations, without being limited to the examples of the above-described embodiment.

The invention claimed is:

1. A programmable controller which executes a plurality of sequence programs for controlling at least one machine included in a machining system and which changes execution time allocation to the sequence programs for each operation cycle in each operation stage of the machining system, the programmable controller comprising:
 a time allocation setting section for setting the execution time allocation;
 a stage analysis section for analyzing the operation stage of the machining system based on data regarding an operation state of the machine;
 a measurement section for measuring cycle time, the cycle time being time taken to execute the operation stage of the machining system; and
 a machine learning device for learning changing of the execution time allocation to the sequence programs for each operation cycle, wherein
 the machine learning device includes
  a state observation section for observing, as a state variable representing a current environmental state, execution time allocation data representing execution time allocation set at time of execution of the operation stage of the machining system, operation stage data representing the operation stage, and machine operation pattern data, the machine operation pattern data being data regarding the operation state of the machine in the operation stage,
  a determination data acquisition section for acquiring cycle time determination data for determining whether cycle time taken to execute the operation stage executed based on the set execution time allocation is appropriate or inappropriate, as determination data representing an appropriate/inappropriate determination result for changing of the execution time allocation to the sequence programs for each operation cycle, and
  a learning section for learning the changing of the execution time allocation to the sequence programs for each operation cycle in relation to the operation stage of the machining system and an operation pattern of the machine using the state variable and the determination data.

2. The programmable controller according to claim 1, wherein
 the learning section includes
  a reward calculation section for finding a reward relating to the appropriate/inappropriate determination result, and
  a value function update section for updating a function representing a value of an action to change the execution time allocation to the sequence programs for each operation cycle with respect to the operation stage of the machining system and the operation pattern of the machine, using the reward, and
 the reward calculation section gives a reward increasing with decreasing the cycle time.

3. The programmable controller according to claim 1, wherein the learning section performs multi-layer calculation of the state variable and the determination data.

4. A programmable controller which executes a plurality of sequence programs for controlling at least one machine included in a machining system and which changes execution time allocation to the sequence programs for each operation cycle in each operation stage of the machining system, the programmable controller comprising:
 a time allocation setting section for setting the execution time allocation;
 a stage analysis section for analyzing the operation stage of the machining system based on data regarding an operation state of the machine; and
 a machine learning device which has learned changing of the execution time allocation to the sequence programs for each operation cycle, wherein
 the machine learning device includes
  a state observation section for observing, as a state variable representing a current environmental state, execution time allocation data representing execution time allocation set at time of execution of the operation stage of the machining system, operation stage data representing the operation stage, and machine operation pattern data, the machine operation pattern data being data regarding the operation state of the machine in the operation stage,
  a learning section which has learned the changing of the execution time allocation to the sequence programs for each operation cycle in relation to the operation stage of the machining system and an operation pattern of the machine, and
  a decision-making section for making a decision regarding the changing of the execution time allocation to the sequence programs for each operation cycle, based on the state variable observed by the state observation section and a learning result of the learning section.

5. A machine learning device which is provided in a programmable controller that executes a plurality of sequence programs for controlling at least one machine included in a machining system and which learns changing of execution time allocation to the sequence programs for each operation cycle in each operation stage of the machining system, the machine learning device comprising:
- a state observation section for observing, as a state variable representing a current environmental state, execution time allocation data representing execution time allocation set at time of execution of the operation stage of the machining system, operation stage data representing the operation stage, and machine operation pattern data, the machine operation pattern data being data regarding the operation state of the machine in the operation stage;
- a determination data acquisition section for acquiring cycle time determination data for determining whether cycle time taken to execute the operation stage executed based on the set execution time allocation is appropriate or inappropriate, as determination data representing an appropriate/inappropriate determination result for changing of the execution time allocation to the sequence programs for each operation cycle; and
- a learning section for learning the changing of the execution time allocation to the sequence programs for each operation cycle in relation to the operation stage of the machining system and an operation pattern of the machine using the state variable and the determination data.

* * * * *